United States Patent
Laurent et al.

(10) Patent No.: US 8,390,422 B2
(45) Date of Patent: Mar. 5, 2013

(54) ELECTRIC CONTROL DEVICE FOR AN AUTOMOBILE

(75) Inventors: Patrice Laurent, Annemasse (FR); Xavier Drouin, Annemasse (FR); Patrick Bonhoure, Annemasse (FR)

(73) Assignee: DAV, Creteil (FR)

(*) Notice: Subject to any disclaimer, the term of this patent is extended or adjusted under 35 U.S.C. 154(b) by 241 days.

(21) Appl. No.: 12/528,463

(22) PCT Filed: Feb. 20, 2008

(86) PCT No.: PCT/EP2008/052093
§ 371 (c)(1), (2), (4) Date: Sep. 20, 2010

(87) PCT Pub. No.: WO2008/107308
PCT Pub. Date: Sep. 12, 2008

(65) Prior Publication Data
US 2011/0000773 A1    Jan. 6, 2011

(30) Foreign Application Priority Data
Mar. 2, 2007  (FR) .................................... 07 01559

(51) Int. Cl.
*H01C 10/10* (2006.01)
(52) U.S. Cl. ......................................... 338/47; 338/114
(58) Field of Classification Search .............. 338/47, 338/114, 310, 333
See application file for complete search history.

(56) References Cited

U.S. PATENT DOCUMENTS

| | | | |
|---|---|---|---|
| 4,810,992 A | 3/1989 | Eventoff | |
| 5,008,497 A | 4/1991 | Asher | |
| 5,335,557 A | 8/1994 | Yasutake | |
| 5,483,261 A * | 1/1996 | Yasutake | 345/173 |
| 5,805,137 A | 9/1998 | Yasutake | |
| 6,072,475 A | 6/2000 | van Ketwich | |
| 6,157,372 A | 12/2000 | Blackburn et al. | |
| 6,452,479 B1 * | 9/2002 | Sandbach | 338/208 |
| 7,080,562 B2 * | 7/2006 | Knowles et al. | 73/818 |
| 8,049,591 B2 * | 11/2011 | Kim et al. | 338/47 |
| 8,058,967 B2 * | 11/2011 | Laurent et al. | 338/47 |
| 2003/0043014 A1 * | 3/2003 | Nakazawa et al. | 338/47 |
| 2004/0252007 A1 * | 12/2004 | Lussey et al. | 338/47 |
| 2011/0006930 A1 * | 1/2011 | Laurent et al. | 341/34 |
| 2011/0007022 A1 * | 1/2011 | Laurent et al. | 345/174 |

FOREIGN PATENT DOCUMENTS

| | | | |
|---|---|---|---|
| EP | 0 541 102 A1 | 5/1993 | |
| FR | 2 683 649 A1 | 11/1992 | |
| FR | 2 798 329 A1 | 9/1999 | |

(Continued)

OTHER PUBLICATIONS

International Search Report w/translation from PCT/EP2008/052093 dated Apr. 16, 2008 (6 pages).

*Primary Examiner* — James Harvey
(74) *Attorney, Agent, or Firm* — Osha Liang LLP

(57) ABSTRACT

The invention relates to an electric control device for an automobile, that comprises a touch-surface sensor using pressure-sensitive resistors and to be assembled with a holder (3) having a recessed or protruding three-dimensional surface, characterized in that the touch-surface (1) of the sensor is shaped so that, at the assembled state, a portion of at least the shaped touch-surfaces (1) meet each other while conforming to the shape of said three-dimensional surface (4) in order to define an essentially continuous touch-surface (1).

9 Claims, 5 Drawing Sheets

FOREIGN PATENT DOCUMENTS

| | | |
|---|---|---|
| FR | 2 800 885 A1 | 11/1999 |
| WO | 97/11473 A1 | 3/1997 |
| WO | 98/08241 A1 | 2/1998 |
| WO | 2006/129945 A1 | 12/2006 |

* cited by examiner

ELECTRIC CONTROL DEVICE FOR AN AUTOMOBILE

FIELD OF THE INVENTION

The present invention relates to an electric control device for a motor vehicle via a touch-sensitive surface using pressure-sensitive resistors, for example for controlling a motorized mechanism for opening and/or closing at least one opening element.

The invention also applies to the control of an electronic member for a multimedia screen or an air conditioning system of a motor vehicle.

BACKGROUND OF THE INVENTION

More recently, it has been proposed to use for these controls touch-sensitive surfaces making it possible to detect a simple pressure of the driver's finger and, depending on the position of the detected pressure and/or on the subsequent movement of this pressure on the surface, to initiate a particular type of action or of control of a member of the motor vehicle. Reference may be made, for example, to documents FR 2 798 329, FR 2 800 885 and U.S. Pat. No. 6,157,372. These touch-sensitive surfaces may be of any type and use various technologies.

Therefore the technology using pressure-sensitive resistors (also known as FSR for "Force Sensing Resistor" sensor) is increasingly ahead of other equivalent technologies, such as for example capacitive or else optical technologies, by virtue of its ease of application and its robustness.

Such sensors are, for example, known by the name "digitizer pad" and documents U.S. Pat. No. 4,810,992, U.S. Pat. No. 5,008,497, FR 2683649 or else EP 0 541 102 are cited as the prior art.

These sensors comprise semiconductive layers sandwiched between, for example, a conductive layer and a resistive layer. By applying a pressure to the FSR layer, the ohmic resistance diminishes, thereby making it possible, by application of an appropriate voltage, to measure the pressure applied and/or to locate the place where the pressure is applied.

The touch-sensitive surface of FSR sensors has a flat shape that can be curved only very slightly in one dimension, which prevents any three-dimensional production.

To improve the user-friendliness of motor vehicles and in particular for control switches or keypads, it may be necessary to incorporate the touch-sensitive surface sensors into control devices having a recessed or protruding three-dimensional surface, having, for example, a shape with a greater or lesser curve.

With the current touch-sensitive surface sensors, the radius that can be accepted by the active zone of the sensor is small (the radius of curvature must be greater than 250 mm), which limits the choice of the shape of the control device.

An alternative consists in having a touch-sensitive surface sensor that is flat in the control device and in giving a curved shape to the device by covering the sensor with a skin, such as a silicone skin, the thickness of which is a function of the desired curve.

Therefore, to obtain a control device of curved shape, there is on the sensor a skin which is thicker at the center than at the edges. However, this arrangement reduces the sensitivity of the sensor because the forces are transmitted to the sensor through the thickness of the skin.

SUMMARY OF THE INVENTION

The object of the present invention is therefore to propose an electric control device for a motor vehicle comprising a touch-sensitive surface sensor capable of taking a three-dimensional shape while retaining uniform sensitivity to the touch.

Accordingly, the subject of the invention is an electric control device for a motor vehicle, comprising a sensor with a touch-sensitive surface using pressure-sensitive resistors and being assembled with a support having a three-dimensional surface, recessed or protruding, characterized in that the touch-sensitive surface of the sensor has a shape fashioned so that, in the assembled state, at least one portion of the fashioned touch-sensitive surfaces join together closely following the shape of said three-dimensional surface in order to form a substantially continuous touch-sensitive surface.

According to other features of the invention,
- the fashioned touch-sensitive surface has a predefined number of circularly arcuate strips the small arched sides of which are connected to a common base having a disk shape so that said touch-sensitive surface closely follows a support having a recessed surface with a truncated cone shape,
- the fashioned touch-sensitive surface has a predefined number of circularly arcuate strips the large arched sides of which are connected to a common base having a parallelepipedal shape so that said touch-sensitive surface closely follows a support having a recessed surface with a truncated cone shape,
- the fashioned touch-sensitive surface has between six and twelve, preferably ten, circularly arcuate strips,
- the fashioned touch-sensitive surface has a spiral shape so that said touch-sensitive surface closely follows a support having a protruding domed, preferably substantially spherical, surface,
- the fashioned touch-sensitive surface has a spiral shape so that said touch-sensitive surface closely follows a support having a substantially conical protruding surface,
- the fashioned touch-sensitive surface has a predefined number of trapezoidal strips the small bases of which are connected to a common polygonal base so that said touch-sensitive surface closely follows a support having a surface in the shape of a truncated polyhedron,
- the fashioned touch-sensitive surface comprises four trapezoidal strips,
- the fashioned touch-sensitive surface comprises a connection lug.

BRIEF DESCRIPTION OF THE DRAWINGS

Other advantages and features will appear on reading the description of the invention and the appended drawings in which.

DETAILED DESCRIPTION

In these figures, the identical elements bear the same reference numbers.

The electric control device for a motor vehicle according to the invention is, for example, capable of controlling a motorized mechanism (not shown) for opening and/or closing an opening element, such as for example a window of a motor vehicle, a sunroof or else the trunk/tailgate/motorized sliding door of a vehicle.

Naturally, this type of device may be adapted to any other electric control of a motor vehicle such as an electric seat control or light controls such as a dome reading light or background lighting.

Figure 1:
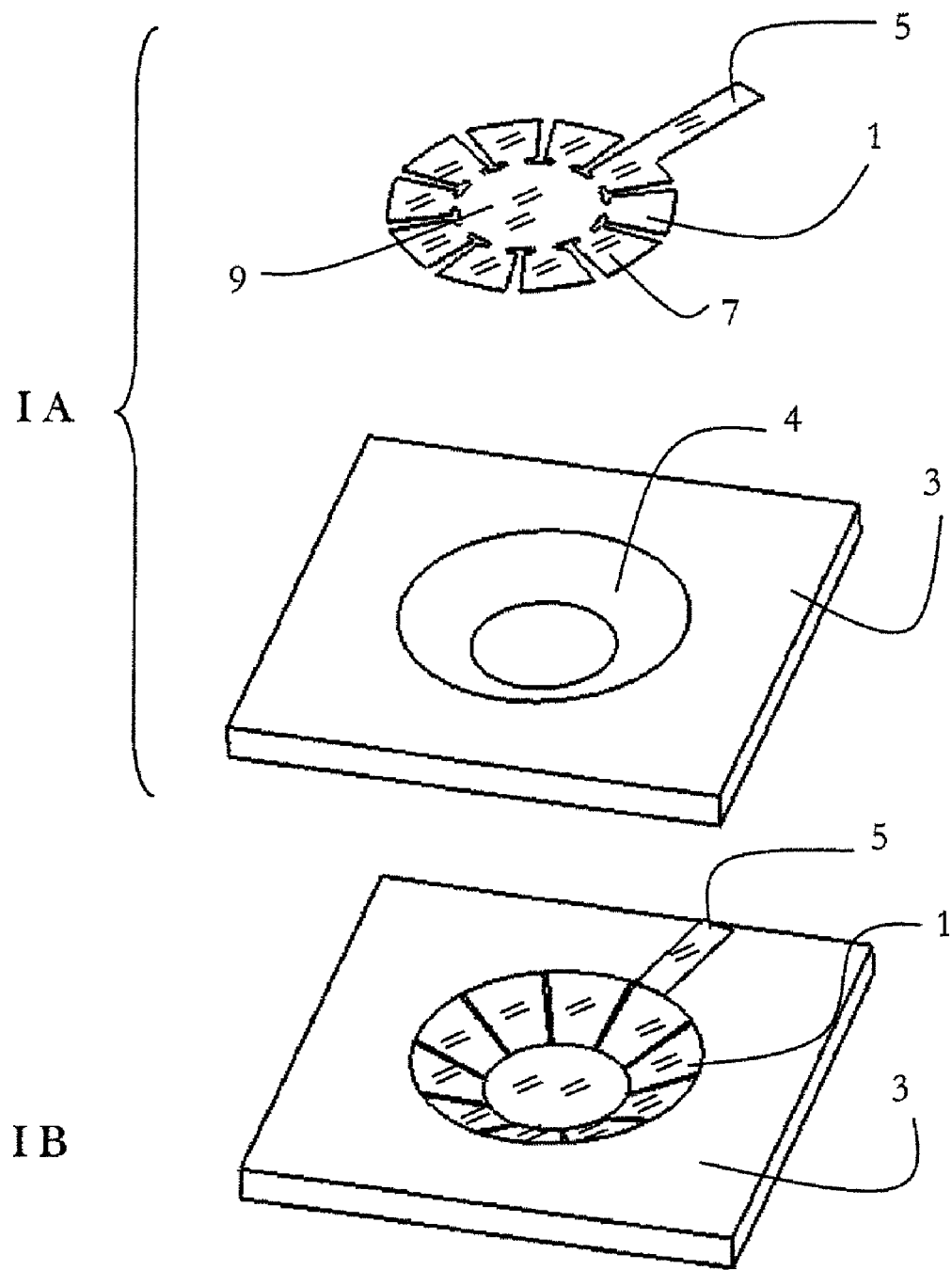
FIG. 1 represents a view in perspective of the sensor, of the support and of the sensor assembled to the support according to a first embodiment of the invention.

FIG. 1 shows an electric control device for a motor vehicle according to the invention before assembly 1A and after assembly 1B.

The device comprises a sensor 1 with a touch-sensitive surface using pressure-sensitive resistors and being assembled, for example by bonding, to a support 3.

The support 3 has a recessed or protruding rounded three-dimensional surface 4 such as a curved or dished surface.

The touch-sensitive surface 1 of the sensor has a shape fashioned so that, in the assembled state, by bonding for example, at least one portion of the fashioned touch-sensitive surfaces 1 join together while closely following the shape of the three-dimensional surface 4 in order to form a substantially continuous touch-sensitive surface 1.

More precisely, the fashioned touch-sensitive surface 1 has a predefined number of circularly arcuate strips 7 the small arched sides of which are connected to a common base 9 having a disk shape so that the touch-sensitive surface 1 closely follows a support 3 having a recessed surface 4 with a truncated cone shape.

In the assembled state (1B in FIG. 1), the edges of the touch-sensitive surfaces 1 are joined together with a virtually nonexistent gap and with no overlap, forming a substantially continuous touch-sensitive surface 1, which makes it possible to prevent the formation of possible bonding bubbles or else bumps which could cause disagreeable touch sensations for the user.

The fashioned shape of the touch-sensitive surface 1 may advantageously comprise a connection lug 5 connected to a printed circuit board for example.

FIGS. 2, 3a, 3b, 4a, 4b, 5a and 5b illustrate four other embodiments of a control device according to the invention.

Figure 2:
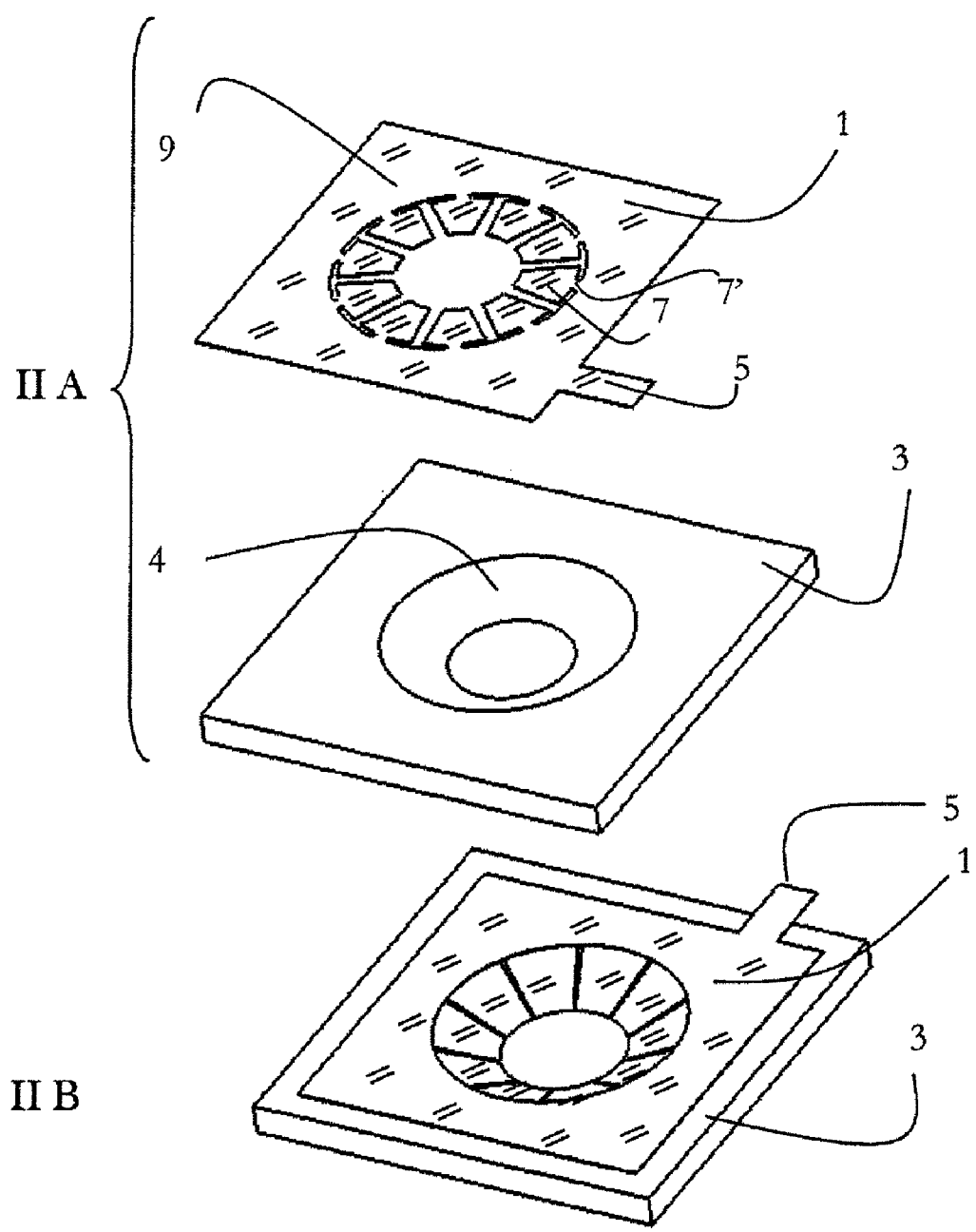
FIG. 2 represents a view in perspective of the sensor, of the support and of the sensor assembled to the support according to a second embodiment of the invention.

FIG. 2 illustrates a second embodiment before assembly IIA and after assembly IIB, in which the fashioned touch-sensitive surface 1 has a predefined number of circularly arcuate strips 7 the large arched sides of which are connected via a tongue 7' to a common base 9 having a parallelepipedal shape so that the touch-sensitive surface 1 closely follows a support 3 having a recessed surface 4 of truncated cone shape.

Advantageously, for the two embodiments described, the fashioned touch-sensitive surface 1 has between six and twelve, preferably ten, circularly arcuate strips 7, which exhibits a good compromise on the one hand for closely following a keypad support surface for example and, on the other hand, for obtaining a sufficient resolution.

Figure 3A:
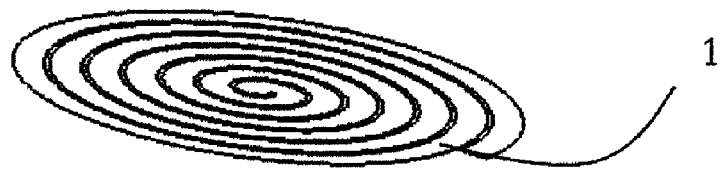
FIG. 3a represents a view in perspective of the sensor and FIG. 3b a view of the support assembled to the sensor according to a third embodiment of the invention.
Figure 3B:
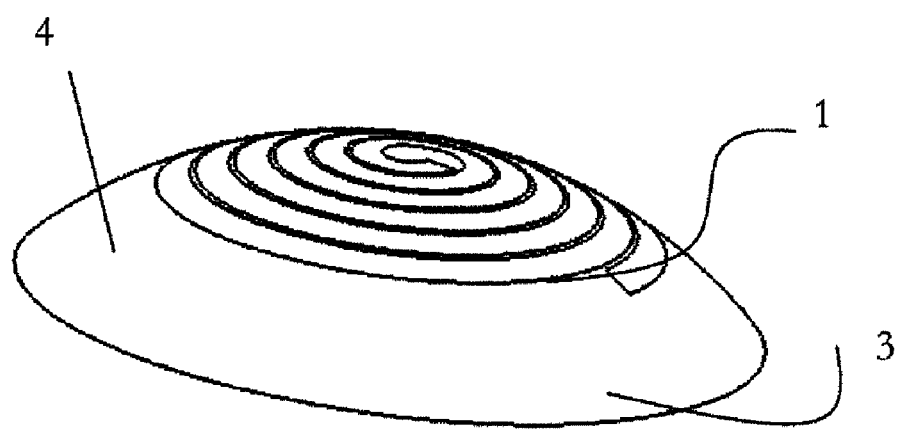

FIGS. 3a and 3b illustrate a third embodiment in which the fashioned touch-sensitive surface 1 has a spiral shape so that the touch-sensitive surface 1 closely follows a support 3 having a domed protruding, preferably substantially spherical, surface 4.

Figure 4A:
FIG. 4a represents a view in perspective of the sensor and FIG. 4b a view of the support assembled to the sensor according to a fourth embodiment of the invention.
Figure 4B:
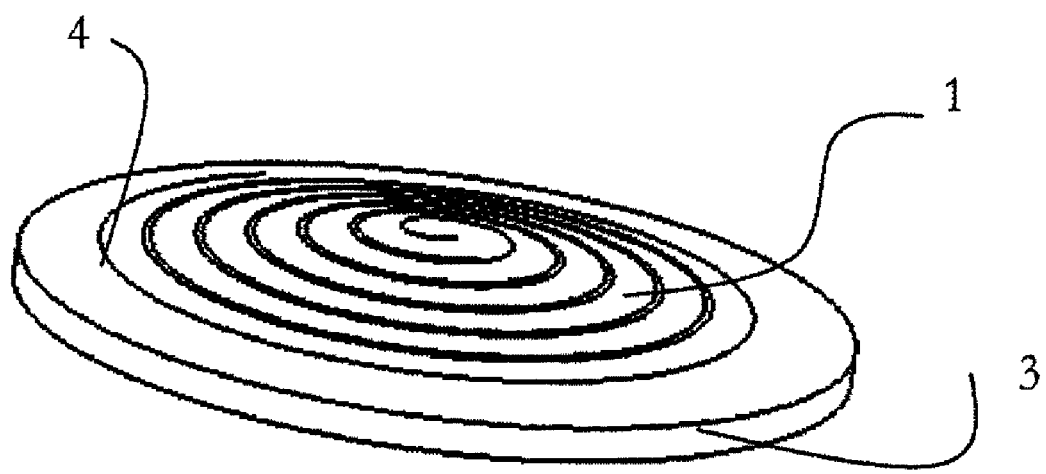

FIGS. 4a and 4b illustrate a fourth embodiment in which the fashioned touch-sensitive surface 1 has a spiral shape so that the touch-sensitive surface 1 closely follows a support 3 having a protruding, substantially conical, surface 4.

According to a fifth embodiment, the fashioned touch-sensitive surface 1 has a predefined number of trapezoidal strips 11 the small bases of which are connected to a common polygonal base 13, so that the touch-sensitive surface 1 closely follows a support 3 having a protruding or recessed surface 4 in the form of a truncated polyhedron.

Figure 5A:
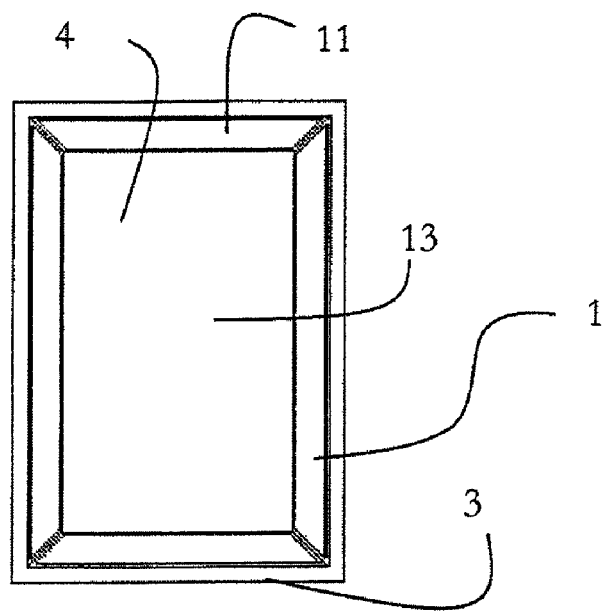
FIG. 5a represents a top view of the support assembled to the sensor according to a fifth embodiment of the invention and FIG. 5b is a view similar to FIG. 5a in perspective.
Figure 5B:
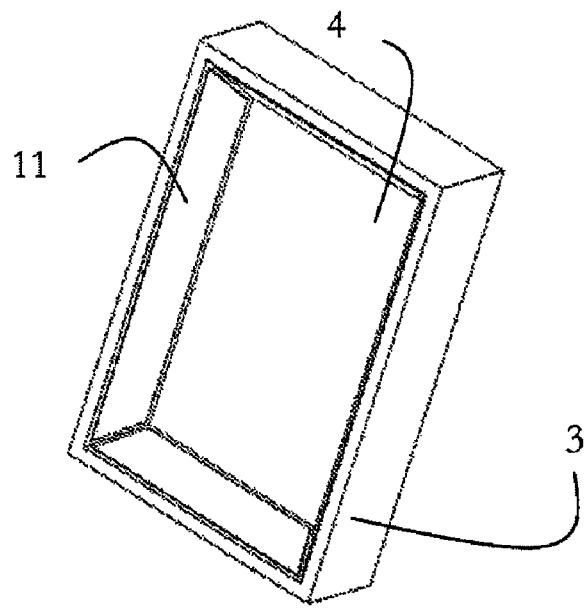

FIGS. 5a and 5b illustrate this fifth embodiment for a fashioned touch-sensitive surface 1 comprising four strips 11 having a shape of an isosceles trapezium the small bases of which are connected to a common parallelepipedal base 13 in order to closely follow a recessed support 3.

This arrangement is particularly suitable for producing keypad keys for example.

The production of the control device may comprise the fashioning of the touch-sensitive surface 1 that is flat initially. The touch-sensitive surface 1 is then assembled to the support 3, for example by bonding the sensor, while closely following its three-dimensional shape.

The touch-sensitive surface 1 may first be preformed in three dimensions by a heat-shaping method for example.

Then, the sensor assembled to the support 3 is covered with a skin, for example made of silicone, in order to form the electric control device.

It is understood that such a control device allows the production of control interfaces having complex, recessed or protruding, three-dimensional shapes, such as for example curved shapes, nevertheless without losing touch-sensitivity.

The invention claimed is:

1. An electric control device for a motor vehicle, comprising:
   a sensor with a touch-sensitive surface constructed using pressure-sensitive resistors, wherein the touch-sensitive surface is assembled with a support having a three-dimensional surface, recessed or protruding,
   wherein the touch-sensitive surface of the sensor has a shape such that, in the assembled state, at least one portion of the touch-sensitive surface joins together closely following the shape of said three-dimensional surface in order to form a continuous touch-sensitive surface.

2. The device as claimed in claim 1, wherein the touch-sensitive surface has a predefined number of circularly arcuate strips the small arched sides of which are connected to a common base having a disk shape so that said touch-sensitive surface closely follows the support having a recessed surface with a truncated cone shape.

3. The device as claimed in claim 1, wherein the touch-sensitive surface has a predefined number of circularly arcuate strips the large arched sides of which are connected to a common base having a parallelepipedal shape so that said touch-sensitive surface closely follows the support having a recessed surface with a truncated cone shape.

4. The device as claimed in claim 2, wherein the touch-sensitive surface has between six and twelve circularly arcuate strips.

5. The device as claimed in claim 1, wherein the touch-sensitive surface has a spiral shape so that said touch-sensitive surface closely follows the support having a protruding domed or spherical surface.

6. The device as claimed in claim 1, wherein the touch-sensitive surface has a spiral shape so that said touch-sensitive surface closely follows the support having a conical protruding surface.

7. The device as claimed in claim 1, wherein the touch-sensitive surface has a predefined number of trapezoidal strips the small bases of which are connected to a common polygonal base so that said touch-sensitive surface closely follows the support having a surface in the shape of a truncated polyhedron.

8. The device as claimed in claim 7, wherein the touch-sensitive surface comprises four trapezoidal strips.

9. The device as claimed in claim 1, wherein the touch-sensitive surface comprises a connection lug.

* * * * *